3,374,153
PROCESS FOR RECOVERY OF GLYCIDOL FROM ALCOHOL BY AZEOTROPIC DISTILLATION WITH A HYDROCARBON
Anthony N. Naglieri, New York, N.Y., assignor to Halcon International, Inc., a corporation of Delaware
Filed July 25, 1966, Ser. No. 567,430
12 Claims. (Cl. 203—44)

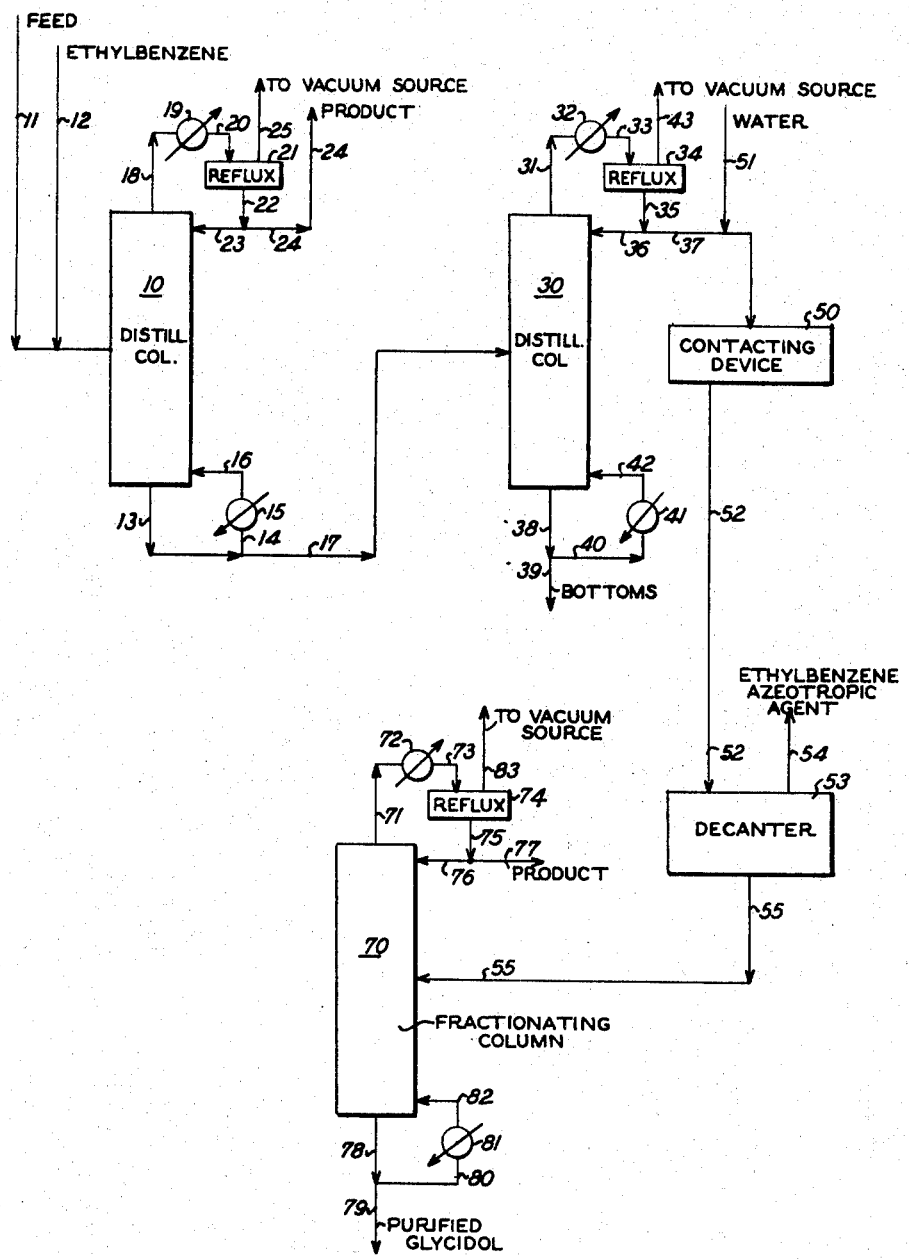

This invention relates to a new and improved process for the separation of glycidol from other oxygen containing organic compounds and more specifically to a method for separating glycidol from allyl alcohol.

Glycidol is a particularly useful chemical intermediate, being outstandingly useful, for example, in the preparation of fatty acid monoglycerides. Prior art methods for preparing glycidol, such as by treatment of 1,3-dihydroxy-2-chloropropane with dilute alkali, are attended by well-known disadvantages.

Recently, however, it has been discovered that glycidol can be formed advantageously by the epoxidation of allyl alcohol. Such an epoxidation can be conducted by reacting allyl alcohol with an organic hydroperoxide in the presence of a suitable catalyst, as is more fully disclosed in United States patent application Ser. No. 419,568, filed on Dec. 18, 1964. This procedure results in the formation of a reaction mixture containing a variety of compounds, including glycidol and unreacted allyl alcohol in addition to higher boiling materials. Some water may also be present in this reaction mixture. The separation of this reaction mixture, or any mixture similarly constituted, is particularly difficult because of the instability of the glycidol, i.e., the tendency of glycidol to decompose at the temperatures required for distillation, even if the distillation is conducted at reduced pressure. Alternatively, while it may be possible to provide pressures sufficiently low to permit obtention of low enough distillation temperatures to avoid decomposition, this is prohibitively expensive on a commercial scale.

In accordance with this invention, it has been found that glycidol can be separated from such mixtures, i.e., mixtures comprising glycidol and allyl alcohol together with higher boiling materials by azeotropic distillation employing, as the azeotropic agent as hydrocarbon capable of forming a low-boiling azeotrope with glycidol. Thus, in one embodiment of the invention, the distillation is conducted in the presence of a hydrocarbon which forms a low-boiling azetrope with glycidol, but which does not form an azeotrope with allyl alcohol; one suitable hydrocarbon of this type is cumene. In another and particularly preferred embodiment of this invention, the distillation is conducted in the presence of a hydrocarbon which forms two separate low-boiling azeotropes, first with allyl alcohol and then with glycidol, which azeotropes are readily separated without glycidol decomposition by distillation. A suitable hydrocarbon forming such azeotropes both with allyl alcohol and with glycidol is ethylbenzene.

The hydrocarbons which can be used as azeotropic agents in practicing the process of this invention are those capable of azeotroping with glycidol. Particularly useful are the aliphatic, naphthenic and aromatic hydrocarbons having the same skeletal carbon structure as the hydroperoxide employed in the epoxidation reaction wherein allyl alcohol is converted to glycidol. For example, if the hydroperoxide employed is ethylbenzene hydroperoxide (i.e., alpha-phenylethylhydroperoxide), a particularly good azeotropic agent would be ethylbenzene. Where cumene hydroperoxide is employed in the epoxidation, cumene is the preferred azeotropic agent. (Alternatively, other azeotropic agents may be employed, such as, for example; benzene, toluene, p-ethyltoluene, isobutylbenzene, tetralin, diisopropylbenzene, xylenes (ortho, meta or para or mixtures thereof) cyclohexane, alkyl substituted cyclohexanes and the like.) Mixtures of the hereinabove specified azetropic agents can be used though the use of such mixtures will make process design more complex.

Under many circumstances it will be unnecessary to separate glycidol from the azeotropic agent, since in many glycidol reactions the azeotropic agent is both inert and also a useful solvent for the reaction. Alternatively, once allyl alcohol and glycidol are separated and glycidol is separated from higher boiling materials, the glycidol azeotrope can be treated so as to recover substantially pure glycidol. This can be accomplished by liquid extraction of the glycidol azeotrope with a solvent in which the glycidol is soluble and in which the azeotropic agent is not soluble. The preferred extractant is water. Pure glycidol is readily separated from water solution by distillation at reduced pressure, since glycidol and water do not azeotrope.

Other, high boiling, materials such as oxygenated hydrocarbons including alcohols, glycerine and ether-alcohol glycidol oligomers are normally present in the feed to the process of this invention. Also present in this feed is the alcohol formed by hydroperoxide decomposition in the course of the epoxidation reaction, e.g., alpha-phenylethanol when ethylbenzene hydroperoxide is used as the epoxidizing agent. Such materials have essentially no effect on the azeotropic distillation; they are separated and withdrawn as a residue stream.

Oftentimes it will not be necessary to add the azeotropic agent to the epoxidation reaction mixture comprising glycidol and allyl alcohol since a suitable azeotropic agent is frequently employed as a solvent during the epoxidation reaction and thus is already present in the epoxidation reaction mixture. Such solvents in the epoxidation reaction not only do not interfere therewith, but are actually beneficial thereto.

The azeotropic distillation can be carried out in a batch, step-wise or continuous manner. The azeotropic agents can all be added initially, in steps, or continuously during distillation. The azeotropic agent can be introduced to the distillation in admixture with the glycidol-allyl alcohol feed stream or separately therefrom.

In the process of this invention, allyl alcohol is the lower boiling of the two essential components of the feed mixture. The glycidol-azeotropic mixture is the next product to distill. Water, if present in the epoxidation reaction mixture, boils before allyl alcohol. Glycerin and other oxygenated by-products of the epoxidation are normally present in the epoxidation reaction mixture and have higher boiling points than does the glycidol azeotrope. If the azeotropic agent selected forms an azeotrope with allyl alcohol as well as with glycidol, the order in which the products are distilled remains unchanged.

Accordingly, the process of the invention is conducted in at least two distillation steps. In the first such step allyl alcohol or an allyl alcohol azeotrope is the overhead product. In the second such step the glycidol azeotrope is the overhead product, while the bottoms from this distillation contains glycerine and glycidol ether-alcohol by-products as well as other oxygenated impurities.

The amount of azeotrophic agent present in the distillation system must at least be sufficient to azeotrope with all of the glycidol in the feed, and suitably should at least be 1% in excess of this theoretical minimum requirement and preferably should be at least 5% or more in excess of this minimum. Where the azeotropic agent forms azeotropes with both allyl alcohol and glycidol, the amount of azeotropic agent present must be sufficient to satisfy the stoichiometric requirements for both the allyl alcohol and glycidol azeotropes. Desirably, an excess of at least 1% over this amount is present; preferably an excess of at least 5% over this amount is present. Amounts of azeotropic agents in excess of these minima can readily be present and are frequently employed. When excess azeotropic agent is employed, the excess is a bottoms product from the system. Azeotropic compositions for the preferred azeotropic agents are given below in Table 1.

TABLE 1

| Azeotropic Agent | Composition of Azeotrope (wt. percent) [1] | | Temp. (° C.) | Press. (mm. Hg) |
|---|---|---|---|---|
|  | Allyl Alcohol | Glycidol |  |  |
| Cumene | ([2]) | 21 | 72 | 65 |
| Ethylbenzene | 67 |  | 42 | 65 |
| Ethylbenzene |  | 11 | 63 | 65 |

[1] The amount of azeotropic agent present in the azeotrope can be determined by difference. Analysis are accurate to ±2%.
[2] No cumene-allyl alcohol azeotrope is formed.

Usually, therefore, at least 10 parts of the azeotropic agent are employed for each part of glycidol present and, preferably, from 10 to 50 parts of the azeotropic agent per part of glycidol in the distillation feed are present. The distillations are performed at a total pressure from about 20 to about 100 mm. Hg, corresponding to a temperature at the bottom of the distillation columns of from about 30 to about 110° C. Preferably, a bottoms pressure of from 70 mm. Hg is selected in order to achieve a distillation bottoms temperature from 50 to 80° C. Each of the distillations, i.e., the removal of allyl alcohol and the removal of the glycidol azeotrope require distillation columns having from 2 to 30 theoretical contacting stages operating with reflux ratios ranging from 1:1 to 15:1. The particular design of the columns required for these separations, as will be apparent to those skilled in the art, will be varied to achieve the economic optimum design for a particular plant capacity at a specific location, but will generally be varied within the aforesaid limits. Columns having more theoretical contacting stages and operating at higher reflux ratios can, of course, be employed, though their use incurs more expense than is necessary.

As stated above, recovery of substantially pure glycidol from the glycidol azeotrope is also within the scope of the present invention. This is accomplished by:

(a) Extraction of the glycidol azeotrope with a selective solvent for glycidol, suitably water; and (b) Distillation of the water-glycidol solution to recover a substantially pure glycidol product.

The extraction operation may be conducted at temperatures of from 0° C. to 60° C. under a pressure sufficient to maintain liquid phase. Preferably, temperatures of from 10° C. to 30° C. are employed. Suitably from 0.1 to 5 parts of water are used per part of glycidol in the extraction. The extraction may be conducted in mixer-settler type apparatus of in counter-current liquid-liquid extraction devices, e.g., in rotating disc contactors, in perforated plate towers or the like. One or a plurality of theoretical contacting stages may be employed in this extraction.

Glycidol can be recovered from water solution by distillation. Water is first distilled off under reduced pressure (eg., at 60 mm. Hg and a head temperature of 41° C.) to avoid glycidol hydrolysis at the higher temperature. Glycidol is then distilled, typically at a distillation column head temperature of 60° C., corresponding to a pressure of 15 mm. Hg. Columns having from 1 to 20 theoretical contacting stages operating at reflux ratios of from 1:1 to 10:1 can be employed. Glycidol product purities of 97% or higher can readily be obtained.

The process of the invention will be more fully explained in conjunction with FIGURE 1, which is a schematic representation of one embodiment of the process wherein the process is conducted continuously and wherein a hydrocarbon capable of forming azeotropes with both allyl alcohol and glycidol, e.g., ethylbenzene, is employed.

A feed stream comprising allyl alcohol and glycidol and other oxygenated by-products is fed to distillation column 10 through conduit 11. Since hydrocarbon solvents such as ethylbenzene are advantageously employed in the epoxidation reaction whence the feed stream is derived, there may be sufficient ethylbenzene azeotropic agent in this feed stream to carry out the process of this invention without the necessity for addition of additional ethylbenzene. If not, ethylbenzene is added to conduit 11 through conduit 12. Heat for conducting the distillation is supplied to column 10 by withdrawing a bottoms product from the column through conduit 13 and passing a portion of the bottoms through conduit 14 to reboiler 15 wherein at least a portion of the stream passing through conduit 14 is vaporized and returned to column 10 through conduit 16. The net bottoms product is withdrawn from column 10 through conduit and passes through conduit 17 to distillation column 30.

The overhead from column 10 is withdrawn through conduit 18 and is condensed in heat exchanger 19 whence it flows through conduit 20 to reflux drum 21. The column 10 overhead is withdrawn from reflux drum 21 through conduit 22 and is divided into two parts. The first portion is returned to column 10 as reflux through conduit 23. The net overhead product is withdrawn through conduit 24. Vacuum is applied to column 10 by a suitable vacuum source (not shown) such as vacuum pumps or steam jet ejectors through conduit 25 opening into reflux drum 21 which communicates with column 10 through conduit 20, condenser 19 and conduit 18.

In column 10, the allyl alcohol-ethylbenzene azeotrope is the primary overhead product. Any water or light hydrocarbons present in the feed to column 10 also are included in the overhead product therefrom. If desired, allyl alcohol present in the overhead product from column 10 can be separated from the azeotroping agent and recycled to the epoxidation reaction wherein glycidol is prepared by allyl alcohol epoxidation, though this is not essential.

Suitably column 10 may have 20 theoretical contacting stages and be operated at an actual reflux ratio (reflux:overhead product) of 8:1 with a column overhead temperature of 42° C. and a pressure of 65 mm. Hg absolute. The actual number of contacting stages will depend on the contacting stage efficiency which, in turn, depends on the type of contacting stage chosen and on the fluid dynamics of such stages; such characteristics are well understood by those skilled in the art.

The net bottoms product withdrawn from column 10 via conduits 13 and 17 comprises glycidol, ethylbenzene and any heavier materials, e.g., glycerine, present in the epoxidation reaction mixture. This net bottoms product passes through conduit 17 to column 30.

The overhead product from column 30 is withdrawn through conduit 31, condensed in heat exchanger 32 and then passes through conduit 33 to reflux drum 34. The total overhead is withdrawn from reflux drum 34 through conduit 35 and a portion thereof is returned to column 30 as reflux through conduit 36. The net overhead product is withdrawn through conduit 37. Heat is supplied to column 30 by withdrawing a bottoms stream through conduit 38 which is then split into two streams. The net bottoms product is withdrawn through conduit 39. The remaining bottoms product passes through conduit 40 to reboiler 41 wherein it is at least partially vaporized, the vapor (and liquid, if any) is then returned to column 30 through conduit 42. Vacuum is applied to column 30 via conduit 43 in the same manner as described previously for column 10.

The net overhead product from column 30, withdrawn via conduit 37, is the glycidol-ethylbenzene azeotrope. The bottoms product from column 30 comprises heavy materials present in the feed stream to the process of the invention together with any excess of the azeotropic agent, ethylbenzene, present in or added to the feed.

Suitably column 30 is provided with 20 theoretical contacting stages and operates at a reflux ratio of 5:1, with an overhead temperature of 60° C. corresponding to a pressure of 60 mm. Hg. Number of contacting stages, reflux ratios, operating temperatures and pressures can be adjusted within the ranges given hereinabove to achieve an economic optimum design for a specific plant.

For recovery of glycidol in a substantially pure form, if desired, the net-glycidol-ethylbenzene azeotrope overhead from column can be fed via conduit 37 to contacting device 50 which may be, for example, a turbomixer or orifice-type flow mixer or other suitable contacting device. Water is added upstream of contacting device 50 via conduit 51. In contacting device 50, the ethylbenzene-glycidol azeotrope is intimately mixed with water, whereby the glycidol is extracted by the water and a mixture of two immiscible liquid phases is formed. The first liquid phase is a glycidol-water solution and the second phase is essentially ethylbenzene, perhaps containing small amounts of glycidol. This two-phase system flows from contacting device 50 through conduit 52 to decanter 53 wherein the two liquid phases are allowed to separate. The upper phase is the ethylbenzene azeotropic agent and is withdrawn from decanter 53 through conduit 54. If desired, this ethylbenzene may be recycled to column 10 via suitable conduits (not shown) communicating with conduit 12, or it may be recycled for use in the epoxidation reaction. The lower or aqueous phase comprises a solution of glycidol and water and is withdrawn from decanter 53 through conduit 55 whence it passes to column 70.

In place of contacting device 50 and decanter 53, a variety of other liquid-liquid contacting devices may be used. Exemplary are perforated plate countercurrent extraction columns and rotating disc contactors. Other liquid-liquid contacting devices are known to those skilled in the art and can be employed in place of those devices specifically disclosed hereinabove.

In column 70, the glycidol-water solution withdrawn from decanter 53 via conduit 55 is fractionated under vacuum to produce substantially pure glycidol, i.e., 90% or greater of glycidol as the bottoms product. The overhead is predominantly water.

Overhead is withdrawn from column 70 through conduit 71, condensed in condenser 72 and it then flows through conduit 73 to reflux drum 74. The overhead is withdrawn from reflux drum 74 through conduit 75 and divided into two portions. One portion is returned as reflux to column 70 via conduit 76. The other portion is net overhead product, predominantly water, and is withdrawn from the system through conduit 77. Heat is supplied to column 70 by taking a portion of the bottoms product, withdrawn from column 70 via conduit 78, and passing it via conduit 80 to reboiler 81 wherein it is at least partially vaporized and returned to column 70 via conduit 82. The net bottoms product is the glycidol product in substantially pure form and is withdrawn from column 70 via conduits 78 and 79.

If desired, the overhead water product can be recirculated instead of discarded, since it will contain small amounts of glycidol. Recirculation would require suitable conduits (not shown) communicating at one end with conduit 77 and, at the other end, with conduit 51. If desired, heat can be supplied to column 70 by open steam injection rather than by indirect heat exchange via reboiler 81, as shown in FIGURE 1. Vacuum is applied to column 70 via conduit 83, communicating at one end with reflux drum 74 and thence, in an analogous manner to that hereinabove described in connection with column 10, to the interior of column 70. The other end of conduit 83 communicates with a suitable means for producing vacuum (not shown).

Suitably column 70 can have 10 to 20 theoretical contacting stages and be operated at an actual reflux ratio of 1:1, with an overhead operating temperature of 44° C. and a pressure of 65 mm. Hg. These operating parameters and the number of theoretical contacting stages can be varied within the ranges given hereinabove.

When the azeotropic agent selected forms an azeotrope with glycidol, but does not azeotrope with allyl alcohol, e.g., when cumene is the azeotropic agent, the arrangement of steps and mode of operation is the same as that described above in connection with FIGURE 1 except that the overhead product from column 10 is substantially allyl alcohol, not an azeotrope.

The invention will be further described in conjunction with the following examples which are presented as illustrative and not as limiting the present invention.

Unless otherwise stated, all parts and percents in the following examples are by weight:

EXAMPLE I

A mixture of 70% ethylbenzene, 9.54% of ethylbenzene hydroperoxide, 0.4 wt. percent vanadium naphthenate, and allyl alcohol with the molar ratio of allyl alcohol to ethylbenzene hydroperoxide being 5:1 is prepared and is reacted in a 2-liter autoclave at 110° C. for 15 minutes under a pressure sufficient to maintain a liquid phase throughout the reaction. In this epoxidation 98.1% of the ethylbenzene hydroperoxide is converted, predominantly to alpha-phenylethanol. 18.6% of the allyl alcohol is converted and glycidol selectivities are 82.2 mol percent based on ethylbenzene hydroperoxide and 87.8 mol percent based on allyl alcohol.

The autoclave is then emptied and its contents, comprising predominantly allyl alcohol, glycidol, alpha-phenylethanol and ethylbenzene are batch distilled at 66 mm. Hg in a 1-in. diameter, 15-plate, Oldershaw column. The first cut, collected while the pot temperature is in the range of 52 to 66° C. and the head temperature is in the range of 40–50° C. and the reflux ratio is in the range of 3:1 to 8:1, is an azeotropic mixture of 67% allyl alcohol in ethylbenzene. This first cut is 24.2% of the charge. A second cut is then collected, which is a 10–11% glycidol-ethylbenzene azeotrope. During collection of this second cut the pot temperature ranges from 90 to 105° C. while the head temperature is 63° C. and the reflux ratio is 1:1. Glycidol recovery in this distillation, in the form of a glycidol-ethylbenzene azeotrope, is greater than 95%.

The glycidol-ethylbenzene azeotrope is then treated so as to recover substantially pure glycidol as follows: 55.4 parts of glycidol-ethylbenzene azeotrope are contacted successively with 4 batches of water, each batch being 15 parts of water. In this manner 99% of the glycidol present in the azeotrope is extracted therefrom. The water-glycidol solution is then distilled in a 12-in. Vigreaux column operated at a pressure of from 55 to 62 mm. Hg and a head temperature of 40° C. to remove the bulk of the water as a first cut. A second cut, consisting of substantially pure glycidol, is then obtained by operating this Vigreaux column at 15 mm. Hg and a head temperature of 58° C. This second cut contains 99.7% pure glycidol and represents 72.9% of the glycidol charged to this distillation. Total glycidol recovery in all cuts, including the bottoms, is approximately 94%.

EXAMPLE II

An epoxidation reaction mixture is prepared by reaction of a feed containing 9.8% cumene hydroperoxide, allyl alcohol, 66.8% cumyl alcohol and 3% of a vanadium naphthenate solution containing 4% of the vanadium salt at 110° C. for 3.5 hours. The molar ratio of allyl alcohol to cumene hydroperoxide in this feed is 5.8:1. In this reaction, 91% of the cumene hydroperoxide is converted and glycidol selectivity based on hydroperoxide converted, is 70 mol. percent. The resultant epoxidation reaction mixture contains 3% glycidol, 18% allyl alcohol and 76% cumyl alcohol.

To 500 parts of this epoxidation reaction mixture are added 800 parts of cumene and the mixture is then batch distilled in a one-inch diameter, 15-plate Oldershaw column operated at a reflux ratio of 5:1. The first cut is the allyl alcohol cut and is substantially free of other materials. Head temperatures and pressures during obtention of this first cut are 25–40° C. and 90 to 65 mm. Hg, respectively.

A second distillation cut is then obtained at a head temperature of 57–80° C. and a pressure of 50–10 mm. Hg. This second cut contains 95% of the glycidol and has a composition of 21% glycidol in cumene. The material remaining in the still pot is primarily a mixture of cumene and cumyl alcohol. No significant glycidol decomposition occurs in this distillation.

I claim:

1. A process for recovering glycidol from a feed mixture comprising glycidol, allyl alcohol and higher boiling materials, said process comprising the steps of:
    (a) conducting a first distillation of feed mixtures whereby a first overhead product and a first bottoms product are obtained, said first overhead product comprising allyl alcohol and said first bottoms product comprising glycidol substantially free from allyl alcohol, and
    (b) conducting a second distillation, the feed to which is said first bottoms product, in the presence of a hydrocarbon azeotropic agent which forms a low boiling azeotrope with glycidol for the recovery, as a second overhead product, of a glycidol-azeotropic agent azeotrope.

2. A process in accordance with claim 1 wherein the azeotrope agent is present in the first distillation and said first and second distillations are vacuum distillations.

3. A process in accordance with claim 2 wherein the amount of azeotropic agent present in said first vacuum distillation is at least sufficient to supply the stoichiometric requirements for formation of the glycidol-azeotropic agent azeotrope with all glycidol present in the feed mixture.

4. A process in accordance with claim 2 wherein the amount of azeotropic agent present in the first vacuum distillation is from about 10 parts by weight of azeotropic agent per part of glycidol present in said feed to about 50 parts by weight of azeotropic agent per part of glycidol present in said feed.

5. A process in accordance with claim 2 wherein the azeotropic agent is selected from at least one member of the group consisting of ethylbenzene and cumene.

6. A process in accordance with claim 2 wherein the azeotropic forms low-boiling azeotropes both with allyl alcohol and with glycidol.

7. A process in accordance with claim 6 wherein the azeotropic agent is ethylbenzene.

8. A process in accordance with claim 1 wherein the azeotropic agent is cumene.

9. A process for recovering substantially pure glycidol from a feed mixture comprising glycidol, allyl alcohol and higher boiling materials, said process comprising the steps of
    (a) conducting a first vacuum distillation of said feed for the removal of allyl alcohol in the presence of a hydrocarbon azeotropic agent which forms a low-boiling azeotrope with glycidol whereby a first overhead product, comprising allyl alcohol, and a first bottoms product comprising glycidol and said azeotropic agent, are formed,
    (b) conducting a second vacuum distillation, the feed to which is the first bottoms product, in the presence of said azeotropic agent for the recovery, as the overhead product, of a glycidol-azeotropic agent azeotrope,
    (c) liquid-liquid extracting the glycidol azeotrope with water to recover glycidol substantially free of the azeotropic agent in the form of a water solution of glycidol, and
    (d) removing water from said solution whereby substantially pure glycidol is obtained.

10. A process in accordance with claim 9 wherein the azeotropic agent forms low-boiling azeotropes both with glycidol and with allyl alcohol.

11. A process in accordance with claim 10 wherein the azeotropic agent is ethylbenzene.

12. A process in accordance with claim 9 wherein the azeotropic agent is cumene.

References Cited

UNITED STATES PATENTS

| | | | |
|---|---|---|---|
| 2,224,849 | 12/1940 | Groll et al. | 260—348.6 |
| 2,248,635 | 7/1941 | Marple et al. | 260—348.6 |
| 2,903,465 | 9/1959 | Suter et al. | 203—69 |
| 3,039,940 | 6/1962 | Prinz et al. | 203—52 |
| 3,231,329 | 1/1966 | Weiss et al. | 260—348.5 |

WILBUR L. BASCOMB, JR., *Primary Examiner.*